UNITED STATES PATENT OFFICE.

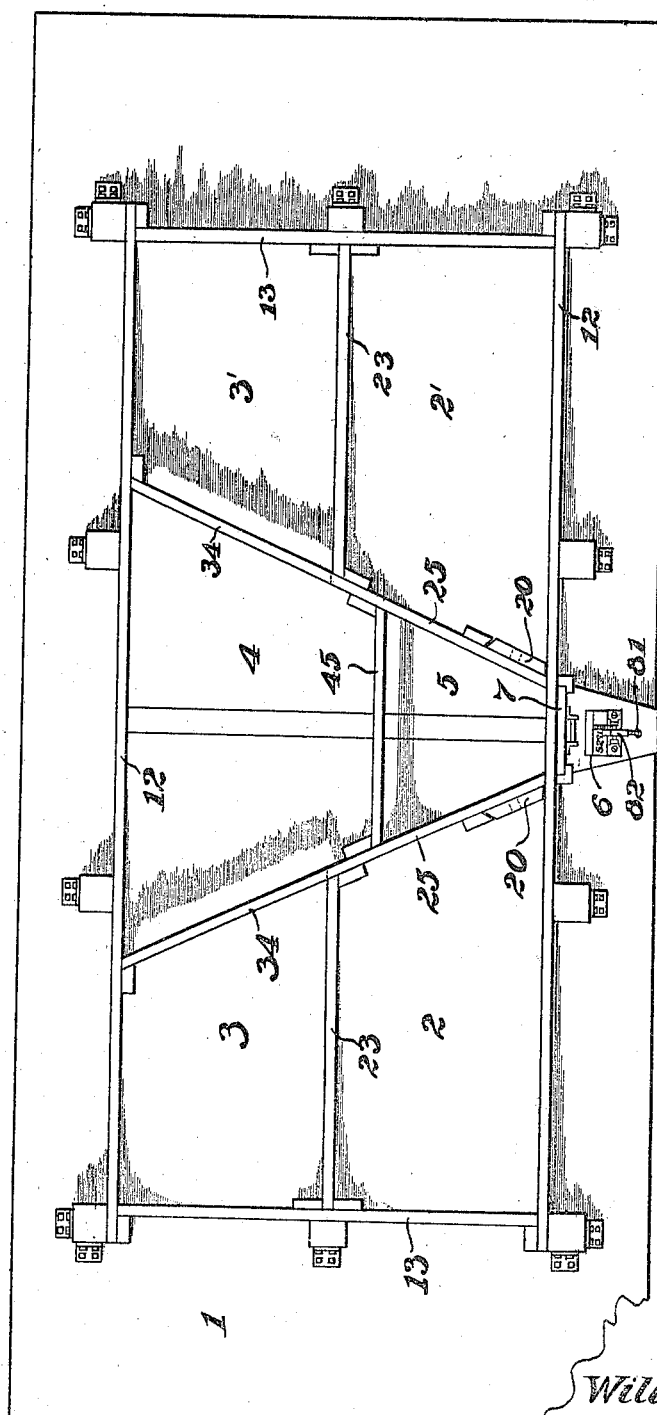

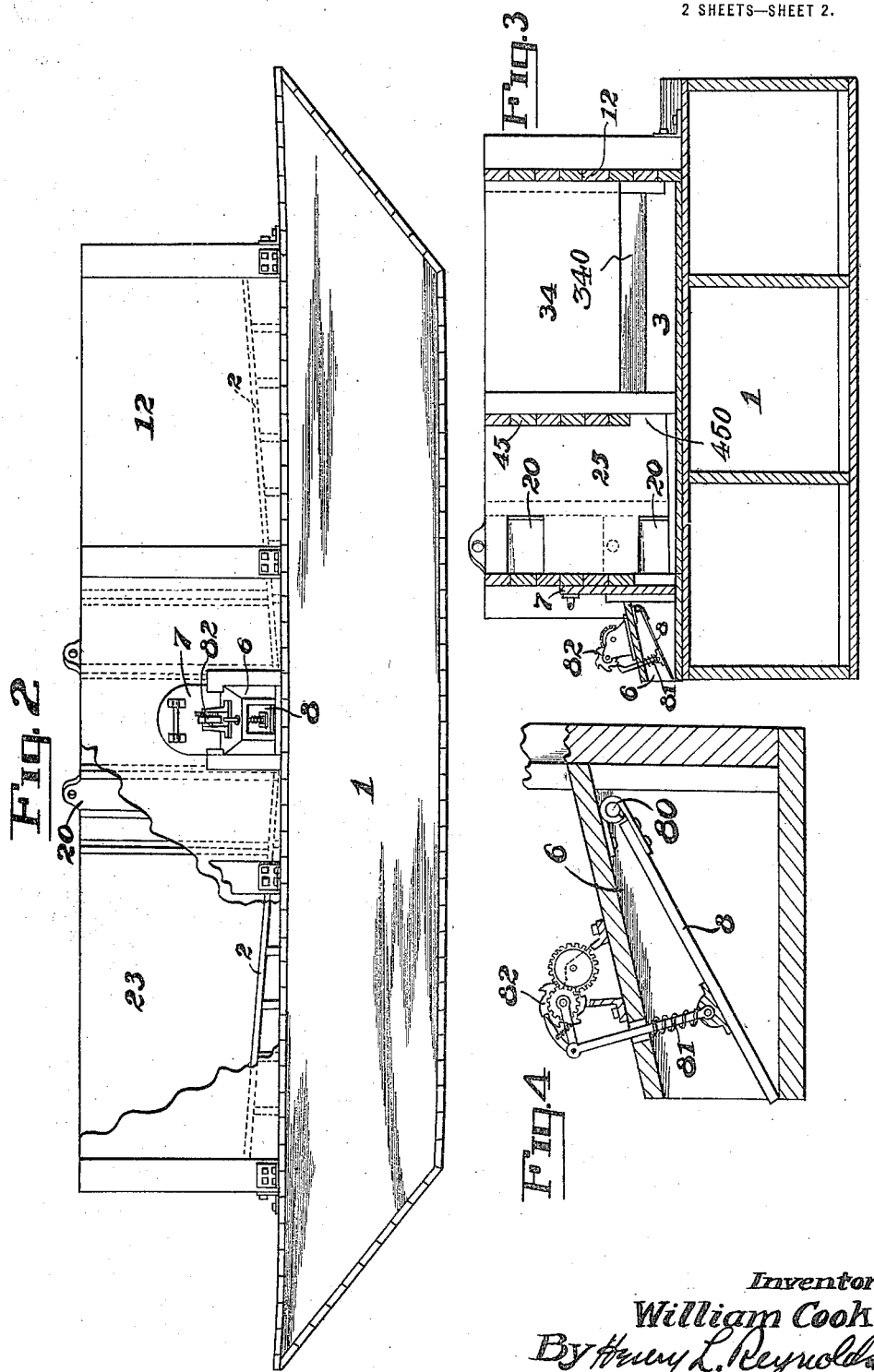

WILLIAM COOK, OF SEATTLE, WASHINGTON.

FISH-SCOW.

1,301,390. Specification of Letters Patent. Patented Apr. 22, 1919.

Application filed December 11, 1916. Serial No. 136,177.

*To all whom it may concern:*

Be it known that I, WILLIAM COOK, a citizen of the United States, and resident of the city of Seattle, county of King, and State of Washington, have invented certain new and useful Improvements in Fish-Scows, of which the following is a specification.

My invention relates to scows which are employed for handling such material as fish and consists of certain improvements whereby the discharge of fish from such scows may be facilitated and cheapened.

The object of my invention is to construct a scow from which the fish may be permitted to flow by gravity so that the unloading of the fish will only necessitate opening of suitable controlling gates to permit the fish to flow out.

My invention comprises certain parts and combinations of parts which will be hereinafter described and then particularly pointed out in the claims.

In the accompanying figures I have shown a scow built in accordance with my invention.

Figure 1 is a top plan view of such a scow.

Fig. 2 is a side elevation thereof with a portion of one side broken away.

Fig. 3 is a transverse sectional elevation of the scow taken centrally thereof, or through the discharge chute.

Fig. 4 is a section through the discharge chute on a larger scale.

It has been customary, in transporting fish to the fish canneries, to load them upon scows, upon the decks of which bins have been constructed to retain the fish in place. In unloading these fish the usual practice has been to handle the fish with forks or shovels. This is a comparatively slow process and requires considerable labor, and also tends to mutilate the fish, as the forks when used, are inserted into the fish rather indiscriminately and perforate the fish at points where it may do harm to the looks of the future product.

Fish when fresh caught, are more or less slimy and, consequently, will slide upon a surface of a comparatively slight inclination, and especially if this surface is wet, as would be natural in handling fish. I have, therefore, made the floor of the bins inclined and controlled the discharge of the fish from the various bins in such way that they may all be discharged at one point, and also, so that the scow may be listed in such a way as to increase the inclination of the floors toward the point of discharge, and thereby secure a sufficient inclination to cause the fish to flow, even though the floor may, transversely of the scow, be level under normal conditions.

In the drawings, 1 represents a scow upon which has been built a series of bins. The outer limit of these bins consists of the two side walls 12 and the end walls 13. The space inclosed within these walls is divided so as to form bins which lie at opposite sides of the scow, that is, a central wall, or walls, 23, running lengthwise of the scow are provided, thus forming bins 2 2' along one side and bins 3 3' along the other side. These bins are in communication, for purposes of discharge, with the centrally placed bins 4 and 5. The latter bins together extend transversely across the scow at the center of its length and are, therefore, placed so that they may be put into communication with all of the other bins.

The partition 45 between the bins 4 and 5 may have a board absent at its lower edge forming an opening 450, or in any other manner these bins may be placed in free communication at the floor line with each other. The same condition may, and preferably does, exist in the partitions 34, this forming an opening 340 which lies between the bins 3 and 4. The partitions between these two centrally placed bins 4 and 5 and those toward the ends of the scow therefrom, preferably converge toward one side of the scow, at which side a discharge chute 6 is provided, this extending from the side wall 12 of the bins to the edge of the scow or beyond, as desired.

A gate 7 controls the discharge from the bin 5 to the discharge chute 6. Similar gates 20 control the discharge from the bins 2 to the bin 5. I have shown two gates 20 in each of these partitions, one being located at the floor line, and the other toward the upper part of the partition whereby the fish from the bins 2 may be partially discharged through the upper gate, if desired.

The discharge chute 6 may have placed therein any suitable type of counting mechanism. I have indicated a board 8 as being mounted in the discharge chute, this being hinged at its upper inner end and adapted to drop down and bear upon, and in a measure, control the flow of fish therethrough. This may be connected with any suitable type of counting mechanism so that each fish, as it passes through, will cause a slight reciprocation of the plate 8, sufficient to actuate the counting mechanism. I have indicated a counting mechanism at the point 82. This may be of any suitable type of construction and its particular description is not deemed to be herein necessary.

In unloading the fish from this scow the gate 7 is raised enough to permit the fish to flow through the discharge chute. Fish are first drawn from the bins located at the opposite side of the scow from the discharge chute. This relieves this side of the scow of its load, while retaining the load upon the side of the scow toward which the discharge is taking place. In consequence of this, the scow will be given a list toward the discharge side, thereby giving the floor an inclination in this direction which will better secure the flow of the fish toward this side. If this list becomes, or threatens to become, greater than is desired, the upper gate 20 may be opened, which communicates with one of the bins 2 lying at the discharge side of the scow. A portion of the contents of the bins may thus be discharged, thus relieving the list of the scow. After the fish have been discharged from the bins at the farther side of the scow, the gates 20 may be opened so as to discharge the fish from the discharge side of the scow. In this way the fish may be easily discharged by gravity, thus avoiding the labor expense due to manual discharge, and also avoiding mutilation of the fish.

It is to be understood that when the fish are discharged from the chute 6, they are received and handled in any suitable manner, as for instance, by providing some form of conveyer which will deposit the fish at any elevation which is desired.

What I claim as my invention is:

1. A fish scow having a series of bins built upon its deck, the bins along one side having controllable discharge connection with a central compartment and a discharge chute communicating with said central compartment, the bins along the opposite side of the scow having free discharge communication with said central compartment, whereby the scow may be listed to secure flow of fish to the discharge chute.

2. A fish scow having a series of bins built upon its deck and comprising two bins which together extend centrally across the bin space, and other bins located toward each end of the scow therefrom, said other bins having floors sloping toward said centrally positioned bins, a discharge chute communicating with one of said central bins, the bins at this side of the scow having discharge connection with this central bin and means for controlling the discharge of these bins into said central bin, the bins at the other side of the scow having freely open discharge openings at the bottom of their separating partitions and the partition between the two central bins having a like discharge opening at its bottom.

Signed at Seattle, Washington, this 5th day of December, 1916.

WILLIAM COOK.

Copies of this patent may be obtained for five cents each, by addressing the "Commissioner of Patents, Washington, D. C."